(12) United States Patent
Kibbee et al.

(10) Patent No.: US 8,851,795 B2
(45) Date of Patent: Oct. 7, 2014

(54) METHOD AND APPARATUS FOR PRE-INSTALLING COLD WATER PIPES FOR A FLOATING OCEAN THERMAL ENERGY CONVERSION FACILITY

(75) Inventors: Stephen E. Kibbee, Katy, TX (US); Peimin Cao, Sugar Land, TX (US)

(73) Assignee: Seahorse Equipment Corp, Houston, TX (US)

( * ) Notice: Subject to any disclaimer, the term of this patent is extended or adjusted under 35 U.S.C. 154(b) by 90 days.

(21) Appl. No.: 13/540,745

(22) Filed: Jul. 3, 2012

(65) Prior Publication Data

US 2013/0011199 A1   Jan. 10, 2013

Related U.S. Application Data

(60) Provisional application No. 61/504,932, filed on Jul. 6, 2011.

(51) Int. Cl.
*F16L 1/15* (2006.01)

(52) U.S. Cl.
CPC ... *F16L 1/15* (2013.01); *Y02E 10/34* (2013.01)
USPC ........ 405/169; 405/158; 405/171; 405/184.4; 405/204; 405/227; 60/641.6; 60/641.7; 441/133; 441/134

(58) Field of Classification Search
CPC ....... Y02E 10/34; Y02E 10/38; Y02E 10/727; E02B 17/02; E02B 17/0043; F16L 1/15; F16L 1/123; E21B 41/08; F03G 7/05
USPC .............. 405/158, 169, 171, 184.4, 203, 204, 405/205, 207, 224, 227; 60/641.6, 641.7, 60/495, 497; 441/133, 134; 138/109, 155, 138/172
See application file for complete search history.

(56) References Cited

U.S. PATENT DOCUMENTS

| | | | |
|---|---|---|---|
| 4,011,729 A * | 3/1977 | Kermel | 405/158 |
| 4,231,312 A | 11/1980 | Person | |
| 4,540,314 A * | 9/1985 | Falkner, Jr. | 405/227 |
| 5,035,542 A * | 7/1991 | Bassett | 405/227 |
| 2009/0309271 A1 | 12/2009 | Miller et al. | |

FOREIGN PATENT DOCUMENTS

WO   WO 2009/024739   *   2/2009   .................... 405/232

* cited by examiner

*Primary Examiner* — Sean Andrish
*Assistant Examiner* — Carib Oquendo
(74) *Attorney, Agent, or Firm* — Wong, Cabello, Lutsch, Rutherford & Brucculeri, LLP.

(57) ABSTRACT

An apparatus for installing means to supply cold water from depth to a floating vessel comprises a template having a plurality of receptacles for receiving a plurality of vertically-oriented cold water pipes. A method for installing a plurality of cold water pipes at a floating, offshore ocean thermal energy conversion facility comprises: lowering such a template to the seafloor; inserting vertically-oriented pipes into the receptacles on the template; providing sufficient buoyancy near the top of the pipe to maintain the pipe in a generally vertical state; positioning a floating vessel having receptacles configured to engage the upper ends of the pipes over the template; raising the template with the inserted pipes from the seafloor until the upper ends of the pipes engage the receptacles; and, locking the pipes in the receptacles such that the pipes are in fluid communication with a cold water sump on the floating vessel.

14 Claims, 6 Drawing Sheets

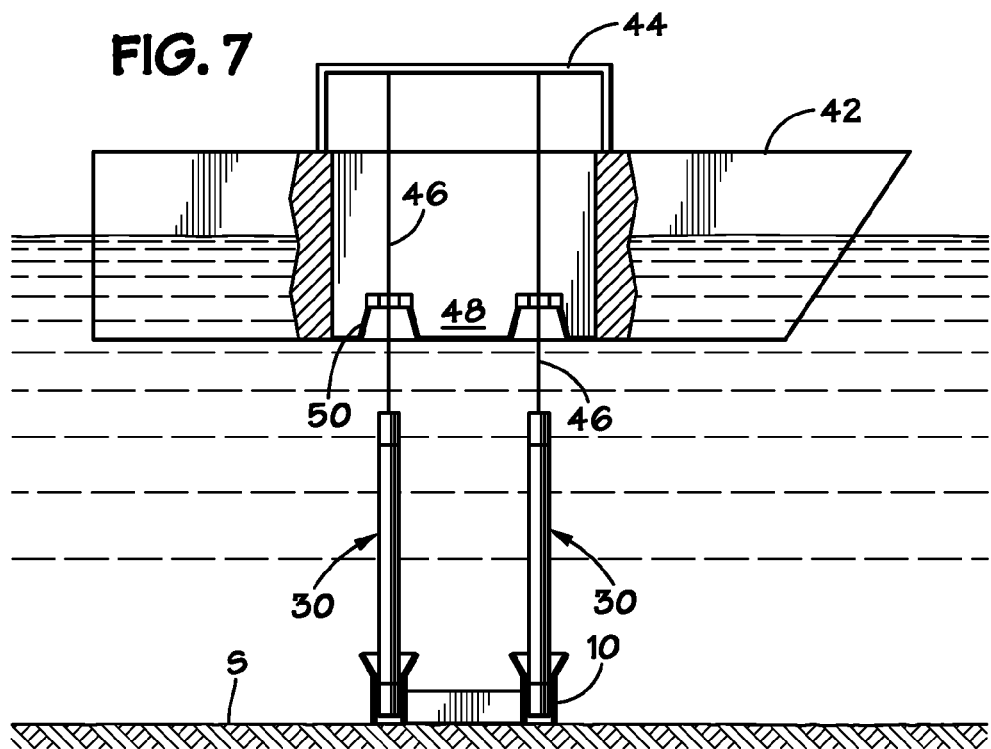
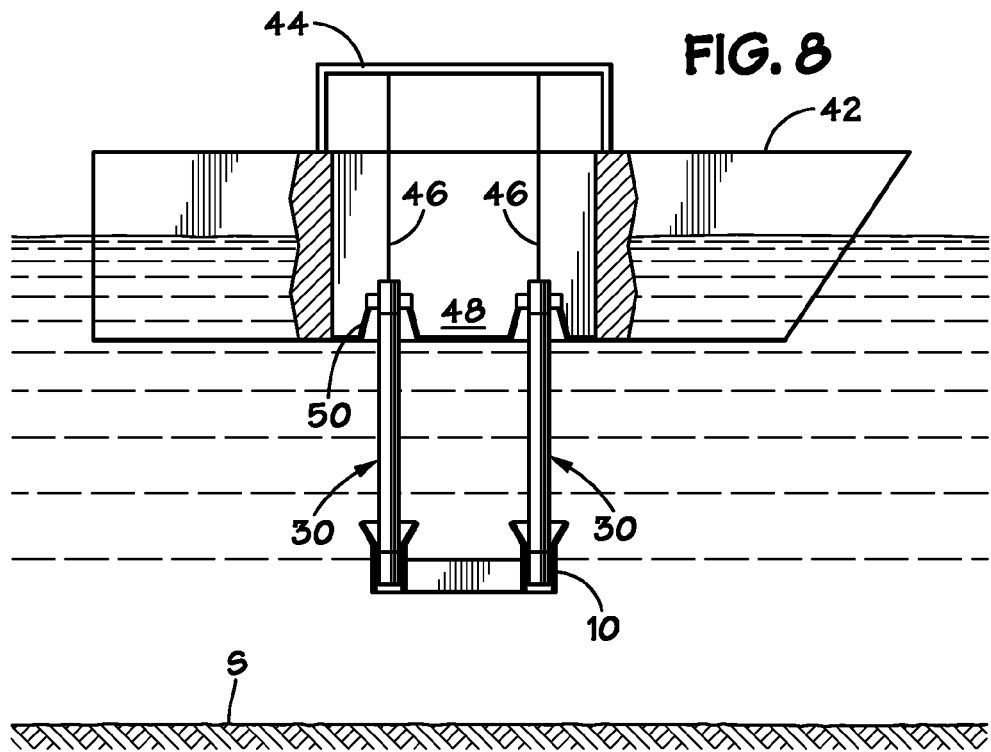

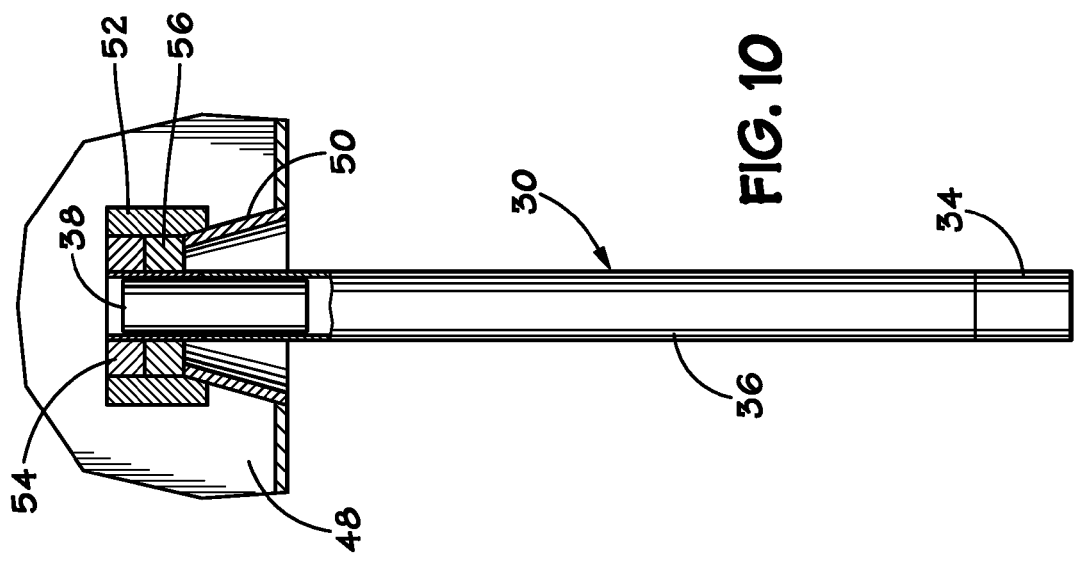
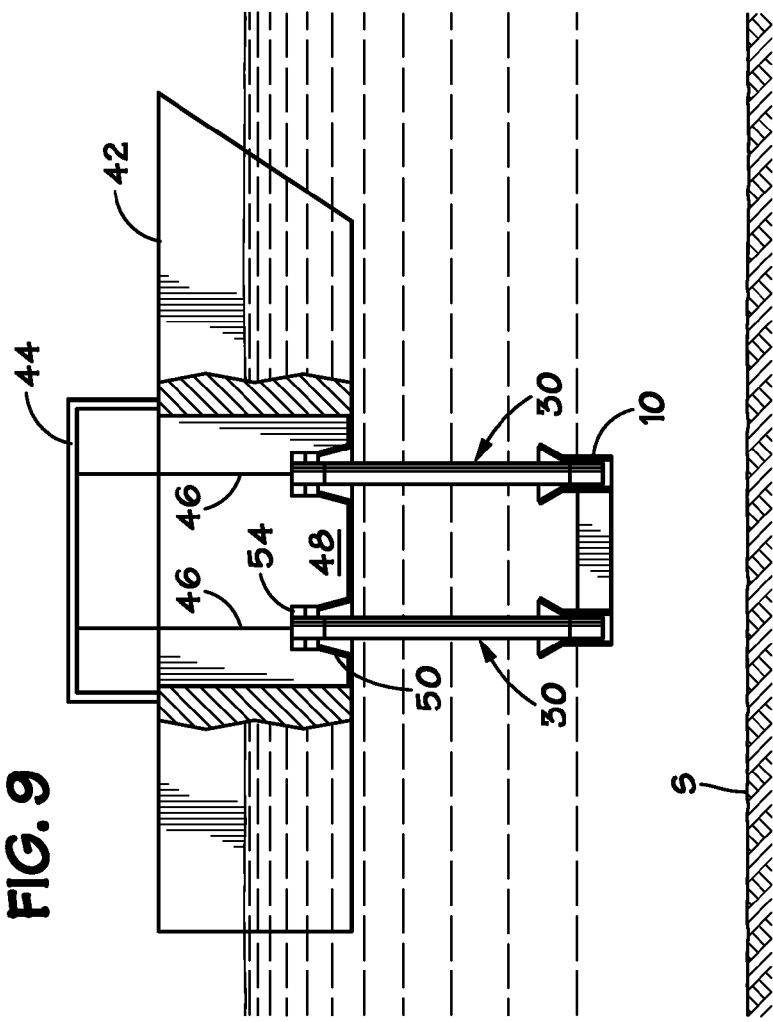

METHOD AND APPARATUS FOR PRE-INSTALLING COLD WATER PIPES FOR A FLOATING OCEAN THERMAL ENERGY CONVERSION FACILITY

CROSS-REFERENCE TO RELATED APPLICATIONS

This application claims the benefit of U.S. Provisional Application No. 61/504,932, filed on Jul. 6, 2011.

STATEMENT REGARDING FEDERALLY SPONSORED RESEARCH OR DEVELOPMENT

Not Applicable

BACKGROUND OF THE INVENTION

1. Field of the Invention

This invention relates to ocean thermal energy conversion (OTEC). More particularly, it relates to the Cold Water Pipe that is used to bring colder water from depth to floating offshore plantships equipped with OTEC facilities.

2. Description of the Related Art Including Information Disclosed Under 37 CFR 1.97 and 1.98

Oceans cover somewhat more than 70 percent of the Earth's surface. This makes them the world's largest solar energy collector and energy storage system. On an average day, 60 million square kilometers (23 million square miles) of tropical seas absorb an amount of solar radiation equal in heat content to about 250 billion barrels of oil. If less than one-tenth of one percent of this stored solar energy could be converted into electric power, it would supply more than 20 times the total amount of electricity consumed in the United States on any given day.

Ocean thermal energy conversion (OTEC) is an energy technology that may be used to convert solar radiation to electric power. OTEC systems use the ocean's natural thermal gradient—the fact that the ocean's various water layers have different temperatures—to drive a power-producing cycle. If the temperature between the warm surface water and the cold deep water differs by at least about 20° C. (36° F.), an OTEC system has the potential to produce a significant amount of power. The oceans are thus a vast renewable resource, with the potential to produce billions of watts of electric power. The cold, deep seawater used in the OTEC process is also rich in nutrients, and it may be used to culture both marine organisms and plant life near the shore or on land.

Ocean thermal energy conversion (OTEC) processes utilize the difference between cooler, deep water and warmer water near the surface of the ocean to power a heat engine and produce useful work, usually in the form of electricity generation.

A heat engine achieves greater efficiency and power when run with a large temperature difference. In the oceans, the temperature difference between surface water and deep water is greatest in the tropics (although still a modest 20° C. to 25° C.). It is therefore in the tropics that OTEC offers the greatest possibilities. OTEC has the potential to offer global amounts of energy that are 10 to 100 times greater than other ocean energy options such as wave or tidal power and OTEC plants can operate continuously thereby providing a base load supply for an electrical power generation system.

The main technical challenge of OTEC is generating significant amounts of power efficiently from small temperature differences. It is therefore necessary to bring cold water up from depth with the minimum amount of power expended in order to achieve acceptable over-all efficiency in an OTEC plant.

The most commonly used heat cycle for OTEC is the Rankine cycle using a low-pressure turbine. Systems may be either closed-cycle or open-cycle. Closed-cycle engines use working fluids that are typically used as refrigerants such as ammonia and R-134a. Open-cycle engines may use vapor from the seawater itself as the working fluid.

An OTEC facility may also supply large quantities of cold water as a byproduct. This may be used for air conditioning and/or refrigeration and fertile deep ocean water may feed biological technologies. Another potential byproduct of an OTEC plant is fresh water distilled from seawater.

U.S. Pat. No. 4,231,312 describes an ocean thermal energy conversion facility having a cold water riser pipe that is releasably supported at its upper end by the hull of the floating facility. The pipe may be substantially vertical and has its lower end far below the hull above the ocean floor. The pipe is defined essentially entirely of a material which has a modulus of elasticity substantially less than that of steel, e.g., high density polyethylene, so that the pipe is flexible and compliant to rather than resistant to applied bending moments. The position of the lower end of the pipe relative to the hull may be stabilized by a weight suspended below the lower end of the pipe on a flexible line. The pipe, apart from the weight, may be positively buoyant. If support of the upper end of the pipe is released, the pipe sinks to the ocean floor, but is not damaged as the length of the line between the pipe and the weight is sufficient to allow the buoyant pipe to come to a stop within the line length after the weight contacts the ocean floor, and thereafter to float submerged above the ocean floor while moored to the ocean floor by the weight. The upper end of the pipe, while supported by the hull, communicates to a sump in the hull in which the water level is maintained below the ambient water level. The sump volume is sufficient to keep the pipe full during heaving of the hull, thereby preventing collapse of the pipe.

U.S. Patent Application Pub. No. 2009/0309271 describes a process and apparatus for multi-shot, liquid-resin-molding of continuous-fiber, composite articles. The process involves the step-wise fabrication of an article wherein continuity of the fibers is maintained between the multiple workpieces of the finished composite article. The system may be used for manufacturing and installing a single large diameter CWP that is made from continuous-fiber composite. This method includes the manufacture of the entire the CWP onboard the OTEC vessel by molding and lowering lengths of continuous-fiber composite during a 2- to 3-month period. Supply vessels transport resin to the vessel which initially acts as an offshore manufacturing plant and is subsequently transformed into an OTEC plant. The advantage of this method is that it may scale to the very largest diameters envisioned for OTEC plants and may produce a robust CWP with good thermal properties.

However, this system has several important drawbacks. In general, this is a radical departure from proven offshore riser technology with consequent uncertainties in cost, schedule, and feasibility.

The manufacturing phase requires low vessel motions. Low vessel motions suggest a semisubmersible vessel. In order to equip a semisubmersible vessel for OTEC service it may be necessary to introduce large supplementary buoyancy and stability modules. This supplementary buoyancy causes the semisubmersible to become less transparent to metocean conditions which increases its motions and may lead to fundamental structural engineering problems—e.g., the preservation of the vessel during tropical storms and ensuring that the many routine operation and maintenance tasks necessitating removal/re-attachment of the supplemental buoyancy do not lead to marine collision events.

During the two- to three-month period of time that the vessel is manufacturing the riser in the exposed location, it is necessary to maintain low motions on the manufacturing plant in order to practice high-quality molding operations and to ensure that the partially-formed, large-diameter, thin-wall CWP does not slip in its special gripping devices.

BRIEF SUMMARY OF THE INVENTION

One aspect of the invention is a method and apparatus that permits one or more cold water pipes (CWP) to be pre-installed at an offshore OTEC site. The apparatus comprises a template having a plurality of receptacles for receiving a plurality of vertically-oriented cold water pipes. A method according to the invention for installing a plurality of cold water pipes at a floating, offshore ocean thermal energy conversion facility comprises: lowering such a template to the seafloor; inserting a plurality of generally vertically-oriented pipes into the receptacles on the template; positioning a floating vessel 42 having receptacles configured to engage the upper ends of the pipes over the template; raising the template with the inserted pipes from the seafloor until the upper ends of the pipes engage the receptacles in the floating vessel 42; and, locking the pipes in the receptacles such that the pipes are in fluid communication with a cold water sump on the floating vessel 42.

BRIEF DESCRIPTION OF THE SEVERAL VIEWS OF THE DRAWING(S)

FIGS. 2 through 9 illustrate successive steps in an installation procedure according to the invention.

FIG. 3 is a side schematic view of a template according to the invention being lowered to the seafloor.

FIG. 4 is a side schematic view of a CWP being upended near a template on the seafloor.

FIG. 5 is a side schematic view of a cold water pipe being lowered and locked in the template on the seafloor.

FIG. 6 is a side schematic view of a template on the seafloor with multiple cold water pipes installed.

FIG. 7 is a side schematic view, partially in cross-section showing multiple cold water pipes pre-installed in a template on the seafloor configured to be pulled into receptacles on a floating OTEC vessel 42.

FIG. 8 is a side schematic view, partially in cross-section showing multiple cold water pipes pre-installed in a template being pulled into receptacles on a floating OTEC vessel 42.

FIG. 9 is a side schematic view, partially in cross-section showing multiple cold water pipes pre-installed in a template installed in receptacles in the cold water sump of a floating OTEC vessel 42.

FIG. 10 is a cross-sectional view of a portion of a floating OTEC vessel with a cold water pipe installed.

DETAILED DESCRIPTION OF THE INVENTION

Offshore Thermal Energy Conversion (OTEC) may use the temperature difference available in some large bodies of water to drive a heat engine such as a Rankine cycle machine to generate electricity. In particular, many tropical oceans have sufficient year-round top-to-bottom temperature differentials to drive power generation from OTEC both day and night. This renewable energy source may be particularly relevant to island economies and military bases in tropical areas that rely on electric power generation that is subject to high fuel transportation costs.

Small scale OTEC facilities have been successfully operated, in some cases for a period of years, demonstrating the technical feasibility of OTEC. However, the economics of OTEC are challenged by the high cost of the system required to deliver large volumes of cold water from deep in the sea to the surface facilities. This cold water pipe (CWP) system is typically a single, large-diameter pipe that extends from its intake near the sea bottom to the energy conversion facility on the surface. In coastal areas having steeply sloping bottoms, the energy conversion facility may be located on land, but a floating OTEC facility has more promise because it minimizes the distance from the cold water intake to the OTEC heat exchangers, consequently decreasing frictional and thermal losses and thereby increasing the overall efficiency of the OTEC process.

A single, large-diameter CWP has the advantage of minimizing frictional losses, but also has two major disadvantages: (1) the designer must depart from available offshore technology to construct and install the large-diameter CWP with attendant increases in technical risk; and, (2) the entire OTEC facility could be shut-down due to a failure in such a single pipe system, thereby increasing operational and economic risk.

An alternative is to use multiple strings of commercially available High Density Polyethylene Pipe (HDPE), fiberglass-reinforced plastic (FRP) or the like that are suitably suspended from the floating OTEC facility. HDPE has adequate thermal properties that preserve the desired temperature differential until the seawater reaches the energy conversion facility. The HDPE pipe may be equipped with ring stiffeners to manage collapse pressure differentials between the inside and outside of the HDPE pipe, allowing seawater pumps to be located on the ship for purposes of operation and maintenance.

Each cold water pipe string may comprise three sections: (1) An upper steel section (32 in FIG. 4) to withstand bending loads and accommodate installation buoyancy means; (2) a long HDPE section (36 in FIG. 4); and, (3) a bottom steel section (34 in FIG. 4) that provides weight to upend the CWP 30 during the installation process and to help limit the angular deflection caused by currents acting on the CWP string during installation.

The present invention comprises a method and apparatus for constructing and installing a system of one or more CWPs.

Figure 1A:
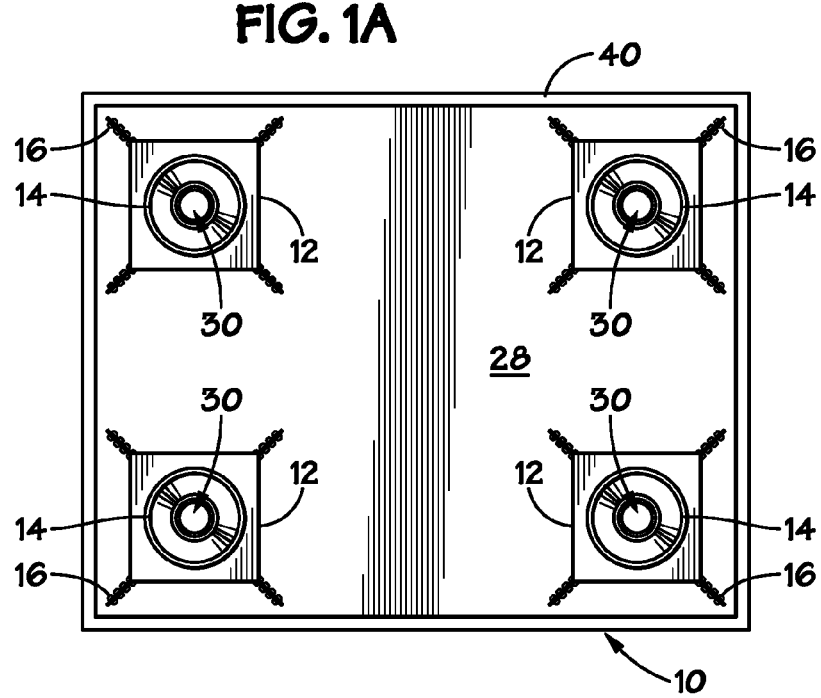
FIG. 1A is a top plan view of a template according to the invention configured for the pre-installation of four cold water pipes at an offshore location.
Figure 1B:
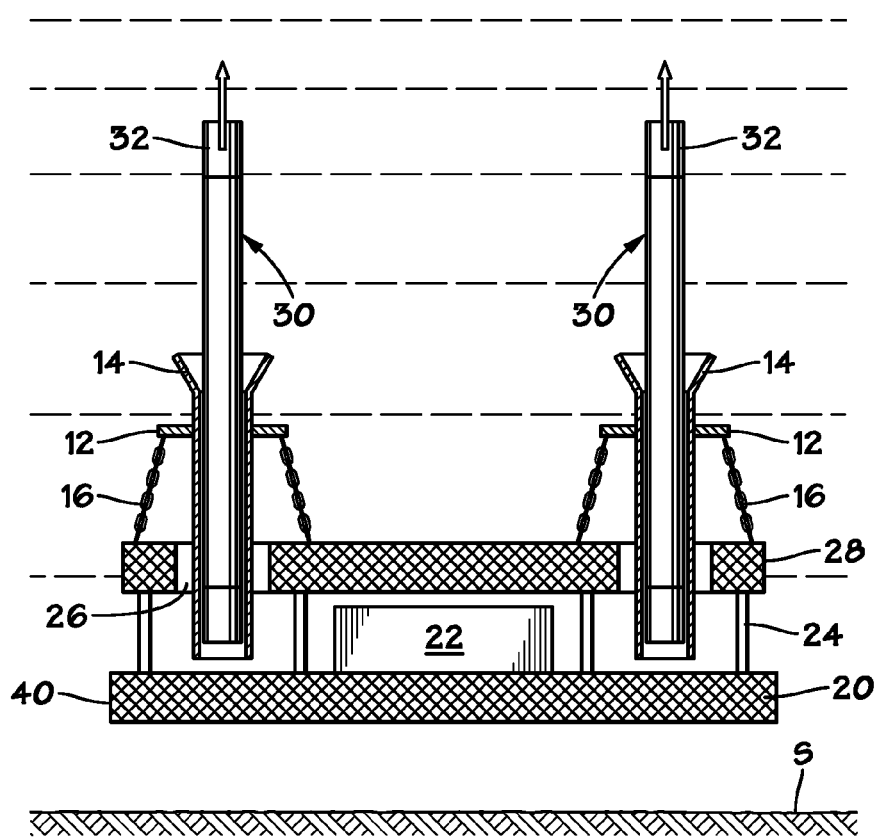
FIG. 1B is a cross-sectional view of the template shown in FIG. 1A.

One particular preferred embodiment of a CWP template 10 is illustrated in FIGS. 1A and 1B. The illustrated template 10 has four CWP receptacles 12 which comprise a funnel-shaped tubular member 14 attached by means of chain 16 to upper frame member 28 which has corresponding openings 26 through which the lower portion of tubular member 14 may pass. Upper frame member 28 is connected to lower frame member 40 by support members 24.

Ballast weight or compartment 22 may be supported on lower frame member 40. Ballast compartment 22 may contain releasable ballast and may comprise a remote release mechanism. In certain embodiments, the ballast release mechanism may be actuated subsea using a remotely operated vehicle (ROV). In yet other embodiments, the ballast release mechanism may be operated via an umbilical line from a surface vessel.

The hydrodynamic properties of template 10 may be affected by the framework material. In the illustrated embodiment, certain portions of the framework comprise open mesh material 20 which provides one level of dampening. In certain other embodiments, the framework may comprise one or more sections of solid cladding which may provide an increased level of dampening.

Figure 2A:
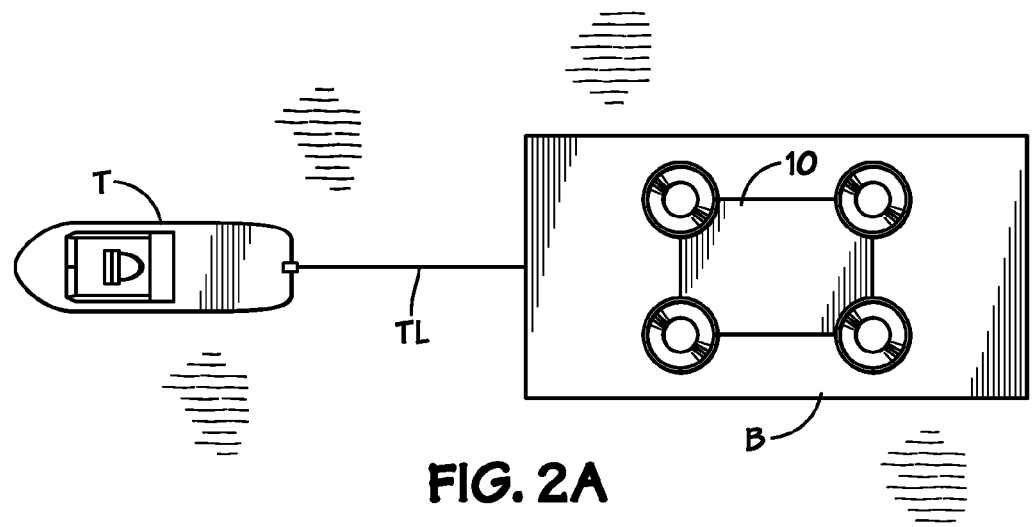
FIG. 2A is a schematic, top plan view of a template according to one embodiment of the invention being towed to an offshore OTEC installation site on a barge or similar vessel.
Figure 2B:
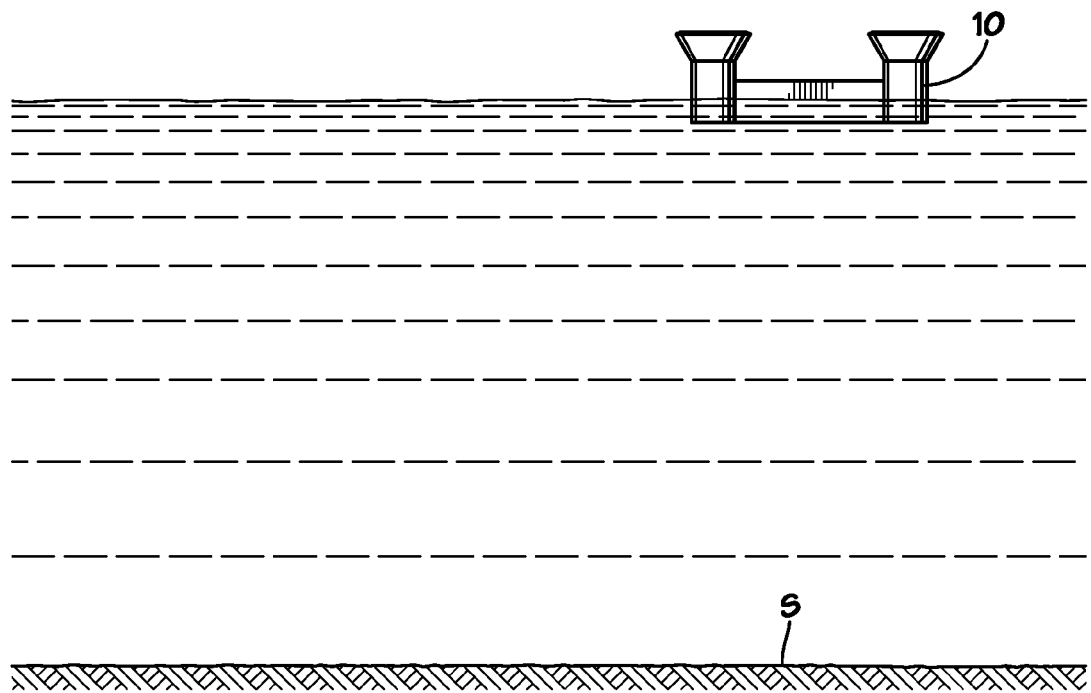
FIG. 2B is a side schematic view of a template according to the invention being launched at the OTEC installation site.

As illustrated in FIG. 2A, the template 10 may be towed on barge B to the installation location by towing vessel T connected via towing line TL. The template may be self-floating or may be transported on a barge B and lifted off or launched (as illustrated in FIG. 2B). In addition to enabling installation of the CWPs prior to arrival of the surface facility (i.e., pre-installation of the CWP), the template 10 may be configured to reduce in-place deflection and stress in the CWP(s) 30.

Figure 3:
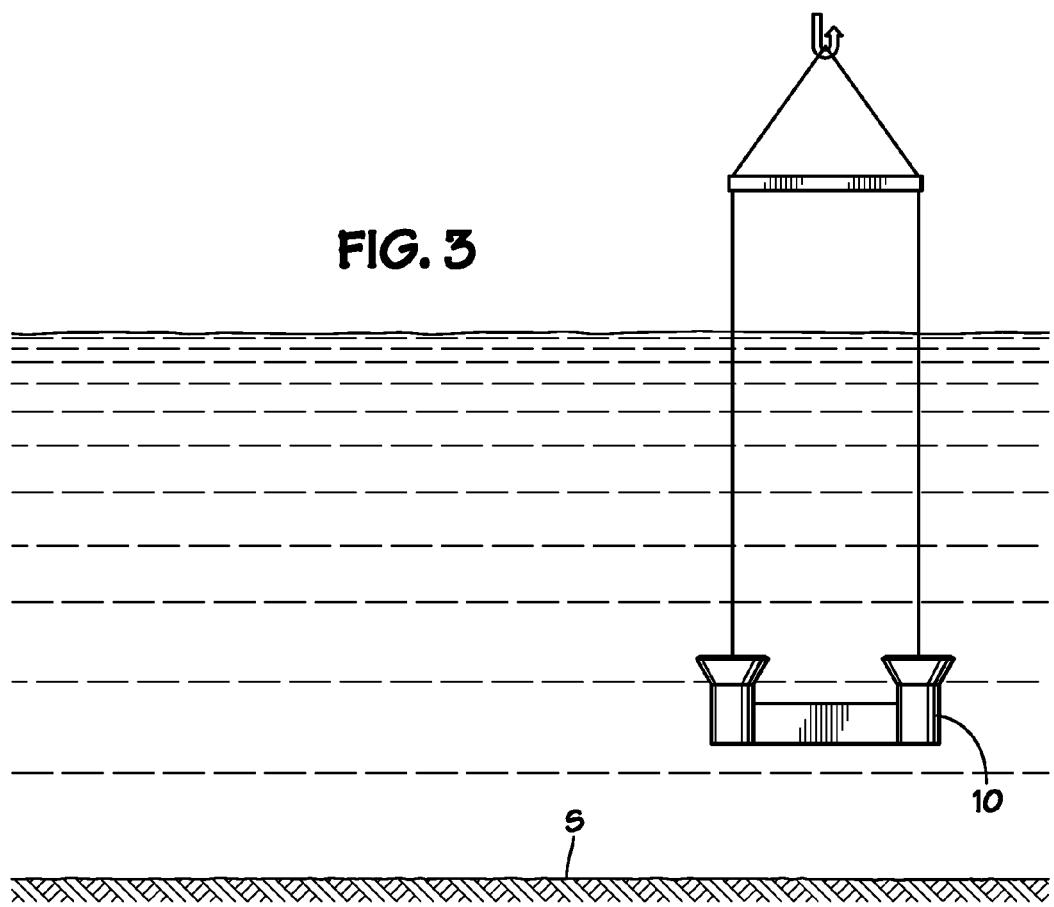

As shown in FIG. 3, in one particular embodiment of the invention, the template 10 is lowered to the seafloor S in the target area. An area of suitable water depth near the installation location may be selected based on water depth and sea bottom conditions, including sea bottom slope and surficial soil. Since this is a temporary 'pre-installation', the accuracy of placement and orientation of the template may have generous tolerances.

Figure 4:
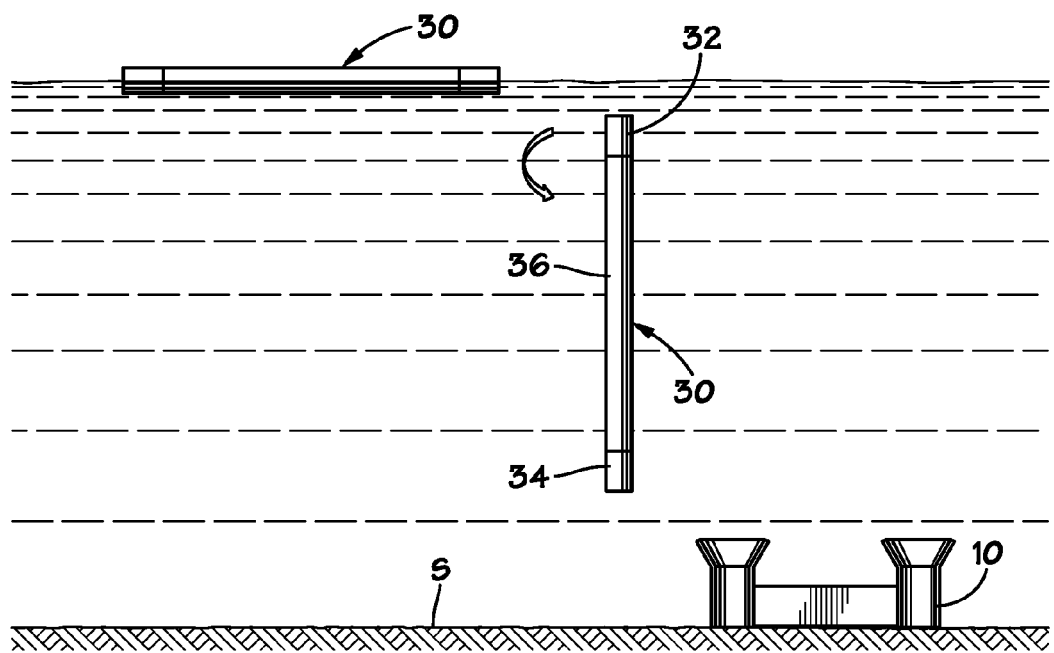

FIGS. 2 through 4 illustrate schematically how each CWP 30 may be towed to the installation location (e.g., by towing vessel T connected to barge B with towing line TL) and upended with its top end supported by a crane vessel hook. As mentioned above, each cold water pipe string 30 may comprise three sections: (1) An upper steel section 32 to withstand bending and accommodate installation buoyancy means; (2) a long polymer (e.g., HDPE) or composite section 36; and, (3) a bottom steel section 34 that provides weight to upend the CWP 30 and helps to limit the angular deflection caused by currents acting on the CWP string during installation.

Figure 5:
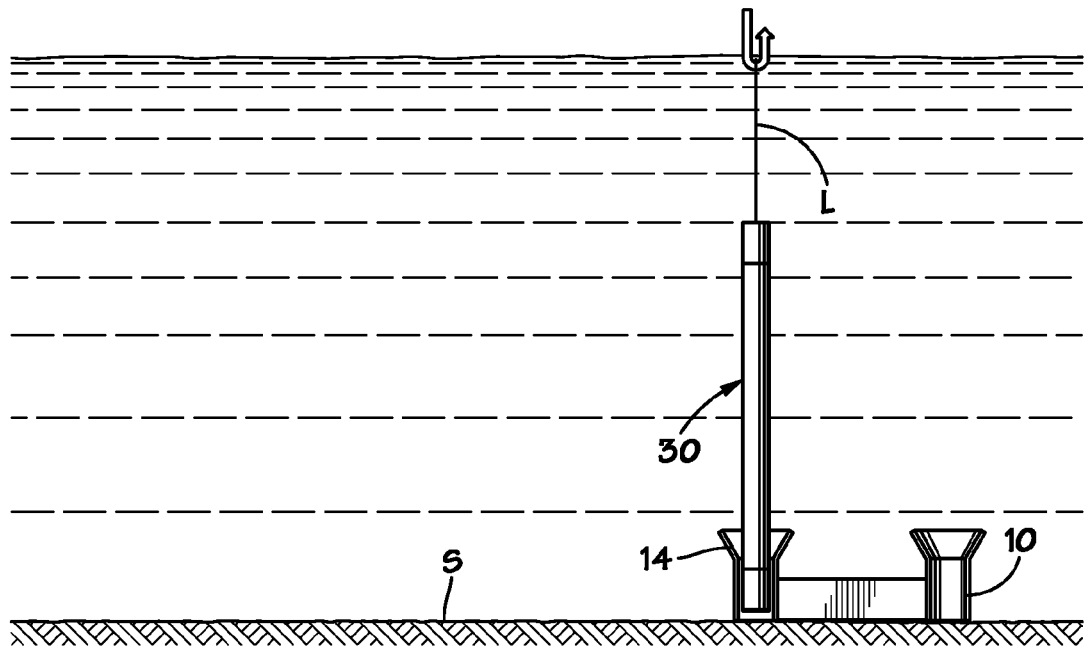
Figure 6:
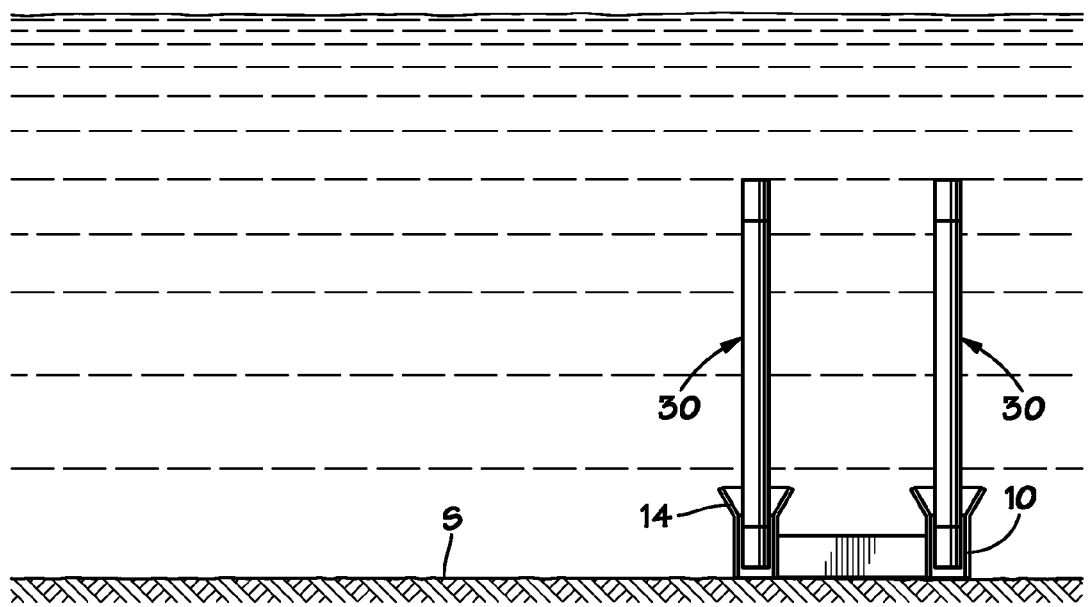

FIG. 5 shows a CWP 30 being lowered and stabbed into the template 10 on the seafloor S. Each CWP 30 is connected into the template (e.g. using a single large diameter connector; multiple smaller satellite connectors; grouted annulus; etc.). Flex means such as chains 16 may be included between the CWP receptacles 12 and upper template frame member 28 so as to tolerate reasonable angular misalignment due to currents. Buoyancy may be provided at or near the upper end of the CWP. For example, a buoyancy pill may be inserted in the upper end of the CWP or buoyancy cans may be externally attached at or near the upper end of the CWP. The buoyant upper end of the CWP and the on-bottom weight of the template on the near-horizontal seafloor S will hold the CWP(s) in near-vertical alignment. Current loading may move each preinstalled CWP out of vertical within a given installation-window tolerance. FIG. 6 shows a template according to the invention resting on the seafloor with a CWP pre-installed in each receptacle 12 on the template 10.

FIGS. 7 and 8 illustrate how the entire CWP assembly may be pulled into stabbing guides 50 located on the bottom of the cold water sump 48 of an OTEC-equipped vessel 42. Pulling lines 46 may be connected from the top of each CWP to winches located on a gantry structure 44 on the ship positioned over the cold water sump. In one particular preferred embodiment, one winch is provided for each CWP string. All CWPs may be simultaneously pulled up through a gimbal table 56 atop each stabbing guide 50. After the CWPs are pulled through the gimbal tables, the CWPs may be clamped with clamps 54 and suspended from the gimbal tables 56. The installation buoyancy pill 38 may be removed from each CWP string and a seal cap 52 may be installed over the gimbal to reduce the rate of ingress of warm seawater into the cold water sump.

After the HDPE pipe is initially stretched by picking up the ballasted template 10 from the seafloor S, it may be necessary to dump certain predetermined solid ballast compartment(s) 22 on template 10 to operate the CWPs at a desired pre-tension.

After all HDPE CWPs are stretched, the suspended template may be levelled using length adjustment means. One means to re-level the template is to re-attach lowering lines, release the CWP clamps, lift/reposition each CWP to level the suspended template, and re-clamp the CWPs in a level configuration. FIG. 9 shows the CWP array installed in the cold water sump of an OTEC vessel 42.

If necessary, the system may be disconnected using the following steps:
  a. The OTEC power system is shut down.
  b. The CWP gantry 44 is moved over the cold water sump 48, a plug is run inside each CWP and set at about at 200 feet below sea level.
  c. The cold water sump 48 is pumped down as far as possible and enough water is removed from the top of each CWP 30 to allow installation of a buoyancy pill in the top of each CWP.
  d. A lowering line is run from the top portion 32 of each CWP to each individual winch on the gantry 44.
  e. The winches pre-tension the lowering lines, divers or remotely operated vehicles (ROVs) positioned near the bottom of the cold water sump 48 may remove the CWP clamps 54, and the CWPs [together with the template 10] may be lowered to the bottom. (The cold water sump 48 may be allowed to fill with warm seawater through the stabbing guides.) CWP lowering lines are released and recovered.
  f. The mooring (which may be a Counterweight Articulated Mooring) is released and the ship 42 backs away from the mooring.

In addition to its utility as an installation aid, the CWP template may also be used: (1) as a frame to laterally support the bottoms of the CWP to manage clashing; (2) to tune the vertical natural frequency and damping of the CWP assembly to manage its dynamic response to heave motion of the OTEC vessel 42; and, (3) as a clump weight.

The CWP template may act as a frame because, as current forces act along on the length of the large diameter CWP, it is possible for adjacent CWPs to collide if they are too close. The cost of the CWP assembly may be reduced by reducing this separation distance by providing a separation frame at the bottom of the CWPs. Alternatively, more CWPs could fit into a given footprint for higher cold water flow and more power output. Depending on the magnitude and consequence of clashing along the CWP, especially when CWPs are free-standing, it may be advantageous to provide 'bumpers' on the CWPs.

A template according to the invention may be used to adjust the CWP Vertical Natural Frequency. For example, a template 10, a CWP comprising a 1000-meter length of HDPE, and the CWP support means produce a vertical elastic system with a certain natural frequency. To manage the response of this elastic system to the motion that the ship may be imposing on the top of the CWP assembly, it may be beneficial to tune the elastic system to limit CWP stresses to acceptable levels. As shown in FIG. 1, the template 10 may be solid or comprise sections of open mesh 20 to produce the desired damping.

A template 10 according to the invention may also act as a clump weight. A clump weight may be needed for one or more of the following reasons:

At the time that all CWPs are self-standing, the template needs to have enough on-bottom weight to offset the buoyancy of the CWPs. This may be provided by weight 22. Alternatively (or additionally), ballast may be provided in ballast compartment 22.

When the CWPs are picked up and suspended in the cold water sump, the HDPE will stretch and creep. By dumping certain solid ballast compartments 22 on the template, CWP pretension may be reduced to a linear elastic range for predictable long-term operation.

A certain amount of weight is needed to limit the offset of the template due to currents acting along the CWP assembly.

The prior art described above attempts to redefine offshore technology by performing weather sensitive manufacturing operations in an exposed offshore location. Conventional offshore technology is based on the concept of minimizing exposed offshore activities, endeavoring to do as much work as possible onshore, and transporting large completed modules to the offshore location for final hook-up at the exposed location during permissible weather windows.

In addition to its foundation in existing offshore technology, the present invention has several other specific advantages:

A CWP may fail or be taken out of service without shutting down the entire OTEC power generation facility.

Most of the installation may be completed before the OTEC vessel 42 arrives at the offshore location which may provide cost, schedule, and/or risk management advantages.

The system designer may tune the CWP system to reduce dynamic stresses in the CWP.

The template 10 laterally supports the CWPs 30 at their bottom end and manages clashing of adjacent CWPs.

The OTEC system may be made disconnectable which may allow cost reductions.

The CWP system may have beneficial impact on the heave and pitch of vessel 42.

Seawater pumps may be dry—i.e., non-submersible—and easily accessible for hook-up, operation and maintenance.

The system may be adapted to larger OTEC plants as larger diameter polymer or composite pipes become commercially available. The number of CWP strings in a given OTEC plant may also be increased by means of the present invention.

Although particular embodiments of the present invention have been shown and described, they are not intended to limit what this patent covers. One skilled in the art will understand that various changes, variations and modifications may be made without departing from the scope of the present invention as literally and equivalently covered by the following claims.

What is claimed is:

1. A method for installing a cold water pipe offshore ocean thermal energy conversion facility mounted on a floating vessel on the surface of an ocean comprising:
   lowering a template to a seafloor;
   inserting a generally vertically-oriented pipe into a receptacle on the template;
   providing sufficient buoyancy at or near the top of the pipe to maintain the pipe in a generally vertical state;
   positioning a floating vessel having a cold water sump and a receptacle in fluid communication with the cold water sump configured to engage the upper end of the pipe over the template;
   raising the template with the inserted pipe from the seafloor until the upper end of the pipe engages the receptacle in the floating vessel; and,
   locking the pipe in the receptacle on the floating vessel.

2. The method as recited in claim 1 further comprising:
   inserting a plurality of generally vertically-oriented pipes into a corresponding plurality of receptacles on the template;
   providing a corresponding plurality of receptacles on the floating vessel configured to engage the upper ends of the pipes;
   positioning the floating vessel having a corresponding plurality of receptacles configured to engage the upper ends of the pipes over the template;
   raising the template with the inserted plurality of pipes from the seafloor until the upper ends of the pipes engage the receptacles in the floating vessel; and,
   locking the plurality of pipes in the receptacles such that the pipes are in fluid communication with a cold water sump on the floating vessel.

3. The method as recited in claim 1 further comprising:
   floating the pipe in the ocean; and,
   towing the floating pipe to a location on the surface of the ocean approximately above the template on the seafloor.

4. The method as recited in claim 3 further comprising:
   upending the floating pipe in the sea by ballasting at least one selected portion of the pipe while supporting one end of the pipe with a crane.

5. The method as recited in claim 1 wherein at least one portion of the pipe is comprised of a synthetic polymer.

6. The method as recited in claim 1 wherein at least one portion of the pipe is comprised of a fiber-reinforced polymer.

7. The method as recited in claim 5 wherein the pipe additionally comprises top and bottom portions comprised of steel.

8. The method as recited in claim 1 wherein the receptacles in the floating vessel are gimbaled.

9. A method for preinstalling a plurality of cold water pipes on a seafloor below a planned location of a floating, offshore ocean thermal energy conversion facility comprising:
   lowering a template to the seafloor;
   inserting a plurality of generally vertically-oriented pipes into receptacles on the template, the pipes not extending into the seafloor;
   providing sufficient buoyancy at or near the top of the pipe to maintain the pipe in a generally vertical state;
   locking the pipes in the receptacles such that raising the pipes also raises the template from the seafloor.

10. The method as recited in claim 9 further comprising:
    floating the pipes in the ocean; and,
    towing the floating pipes to a location on the surface of the ocean approximately above the template on the seafloor.

11. The method as recited in claim 10 further comprising:
    upending the floating pipes in the sea by ballasting at least one selected portion of each pipe while supporting one end of each pipe with a crane.

12. The method as recited in claim 9 wherein at least one portion of each pipe is comprised of a synthetic polymer.

13. The method as recited in claim 9 wherein at least one portion of each pipe is comprised of a fiber-reinforced polymer.

14. The method as recited in claim 12 wherein each pipe additionally comprises top and bottom portions comprised of steel.

* * * * *